Figure 1:
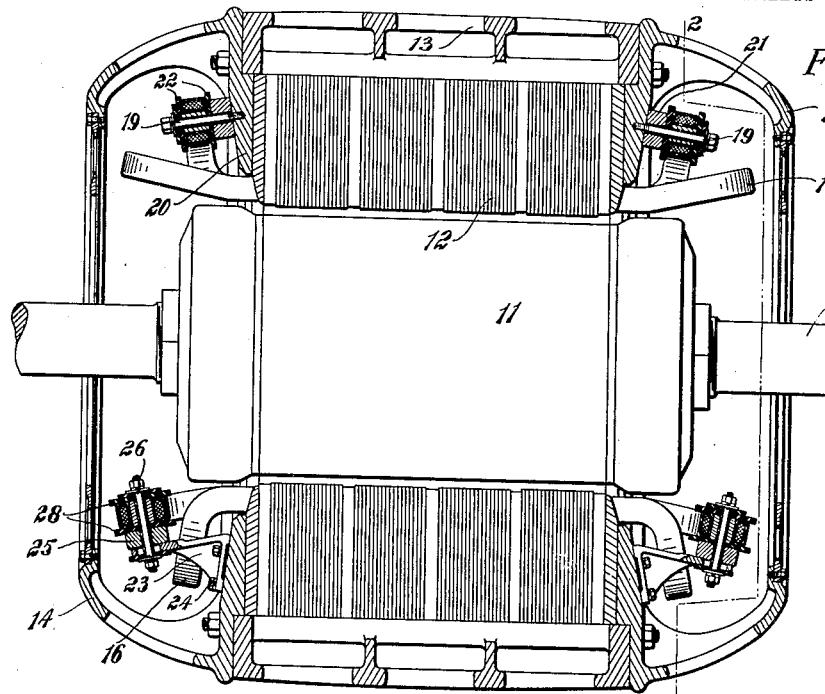

B. A. BEHREND.
COIL SUPPORT FOR DYNAMO ELECTRIC MACHINES.
APPLICATION FILED NOV. 27, 1905.

971,820.

Patented Oct. 4, 1910.

2 SHEETS—SHEET 1.

Witnesses:
George J. Schwartz
Fred J. Kinsey

Inventor:
Bernard A. Behrend.
By
Chas. E. Lord
Attorney.

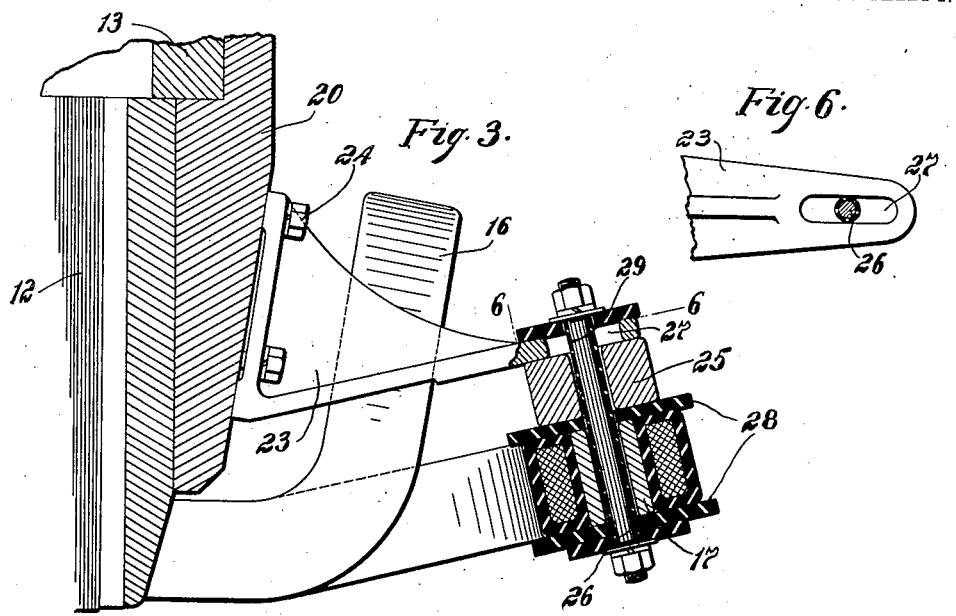
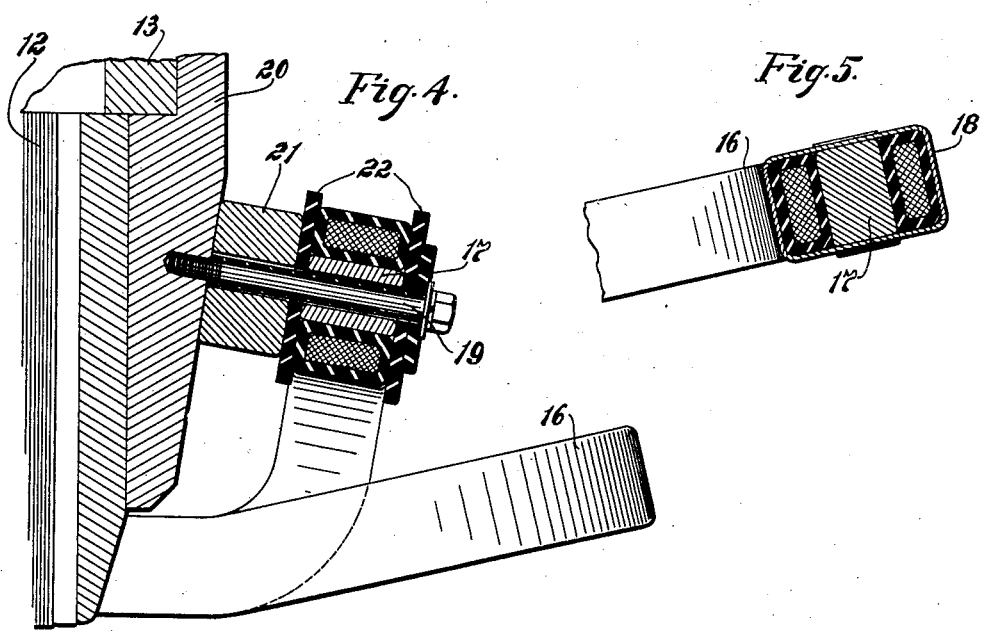

UNITED STATES PATENT OFFICE.

BERNARD ARTHUR BEHREND, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

COIL-SUPPORT FOR DYNAMO-ELECTRIC MACHINES.

971,820.  Specification of Letters Patent.  Patented Oct. 4, 1910.

Application filed November 27, 1905. Serial No. 289,220.

*To all whom it may concern:*

Be it known that I, BERNARD ARTHUR BEHREND, citizen of the United States, residing at Norwood, in the county of Hamilton and State of Ohio, have invented certain new and useful Improvements in Coil-Supports for Dynamo-Electric Machines, of which the following is a full, clear, and exact specification.

My invention relates to dynamo electric machines and especially to the means for supporting and bracing the stator coils.

In dynamo-electric machines such as multiphase generators of the rotating field type, as ordinarily constructed, the end turns or portions of the stator coils which project beyond the core are left unsupported. When such machines are in operation, the projecting portions of the coils vibrate to a greater or less extent. The severity of vibration in the stator coils depends largely upon the type of winding employed and the size and pitch of the coils. It is particularly severe in the so-called chain windings which consist of groups of concentric coils, especially if the pitch of the coils, or the number of coils per group is large. If this vibration is severe and is allowed to continue for a considerable time, it may weaken the insulation and cause the winding to be burned out. The currents generated in the armature coils set up magnetic fields around said coils and these magnetic fields tend to attract or repel one another. Ordinarily the actions between said fields are not sufficient to cause any damage. However, it has been found that if certain large machines are accidentally short circuited the magnetic fields are so intensified that the forces of attraction or repulsion become sufficient to distort or twist out of place the portions of the coils which project beyond the armature core and are unsupported thereby, causing considerable damage.

The object of my invention is to so support and brace the projecting portions or end turns of the coils that vibration and the danger of injury to the coils, in case a machine is short circuited, is avoided.

In carrying out my invention, I arrange the coils in groups and clamp the end turns of each group separately to the frame of the machine.

More specifically considered my invention consists of an alternating current dynamo electric machine, the stationary armature of which is provided with a multiphase winding consisting of coils arranged in groups, the groups having end turns arranged at different angles to the axis of the machine, the end turns arranged at one angle being clamped directly to the frame of the machine, and the end turns arranged at another angle being supported on and clamped to brackets whereby the coils will always be held in place.

My invention still further consists in certain novel details of construction and combinations of elements described in the specification and set forth in the appended claims.

Reference is had to the accompanying drawings in which—

Figure 2:
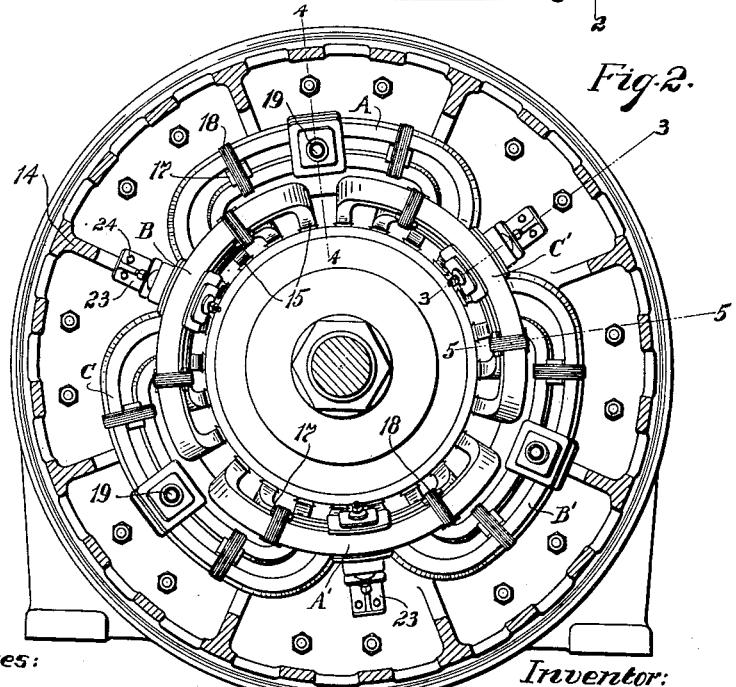

Figure 1 is a longitudinal sectional elevation of a three phase turbo-alternator equipped with my invention; Fig. 2 is a transverse section along the line 2—2 of Fig. 1; Fig. 3 is an enlarged partial section along the line 3—3 of Fig. 2; Fig. 4 is an enlarged partial section along the line 4—4 of Fig. 2; Fig. 5 is an enlarged section through one set of coils, the section being taken along the line 5—5 of Fig. 2; and Fig. 6 is a partial section along the line 6—6 of Fig. 3.

I have shown at 10, a shaft, supporting the rotor 11 of the dynamo electric machine which is in this case a three phase turbo-generator. The stationary armature consists of laminæ 12, supported in a frame 13, which is provided at each side with projecting end bells or end heads 14. Mounted in the core slots are the armature coils 15 of a chain winding which coils are provided with the usual end turns 16. I have in this case shown a three-phase four-pole turbo-generator and I have shown two coils per pole per phase but I wish it to be understood that my invention is not limited in its application to a generator of this specific type. The two sets or groups of coils of the three phases I have designated respectively A, A'—B, B' and C, C'. It will be seen that the sets of coils are provided with end turns which are bent in two different angles to the axis of the machine, the sets of coils alternately extending approximately radially outward adjacent the armature, and approximately in an axial direction, the latter being only slightly bent outward. Thus the sets of coils A, C and B' are bent outward and the sets B, A' and C' extend in an axial direction. The end turns 16 of the coils, as is seen, project a considerable distance beyond each end of the core, consequently they would tend to vibrate, particularly when the machine is operated under heavy load. Furthermore when the machine is in operation the overlapping end turns of the different groups of coils are enveloped in magnetic fields which react upon one another. If the machine should be accidentally short circuited, the magnetic fields would become many times greater than under ordinary conditions and the actions of attraction or repulsion might become so great as to twist or distort the end portions or end turns of the coils out of their proper positions. To avoid danger of injury to the coils from either of the above causes, I support and brace the coils in the manner now to be described. The coils of each set are spaced apart by blocks of insulating material, preferably wood, 17, and are bound together and to the spacing blocks by wrappings of cord, wire or tape 18. Thus relative movement between the coils of each set is prevented.

The ends of the alternate sets of coils which are bent outward adjacent the armature are held in position by screws or bolts 19 which extend into the stationary frame, in this case a portion 20 of the end bell or end head. These end turns are spaced from the frame by blocks of wood 21 through which the bolts 19 pass. The bolts pass between the coils of each set and through the central spacing block 17. Plates or sheets 22 of insulating material are interposed between the coils and the heads of the screws or bolts, and between the coils and the blocks 21. I have shown in this case, a single clamp at each side of the machine for holding the end turns of each set to the frame. If necessary, however, more than one clamp can be employed for this purpose, the number of clamps depending on the length of the end turns.

The end turns of the alternate sets of coils, which extend approximately in an axial direction, are supported on and clamped to brackets 23, which are secured by bolts or screws 24 to each side of the frame, in this case portion 20 of the end head or end bell. Blocks of wood 25 are interposed between the coil ends and the brackets. Bolts or screws 26 pass through the wooden spacing blocks 17 between the coils, through the blocks 25 and through slots 27 in the ends of the brackets. Sheets or plates 28 of insulating material are interposed between the coils and the blocks and between the coils and the heads or nuts of the bolts or screws 26. Each bolt 26 is surrounded by a tube 29 of insulating material. The slots 27 in the ends of the brackets, permit the adjustment of the bolts and permit the use of the same sized brackets for coils of slightly different lengths and shapes. I have shown a single bracket at each side of the machine for supporting each set, but it is evident that more than one bracket can be employed if necessary.

It is seen that the coils of each group or set are held firmly in position so that serious vibration and relative movement in case of the occurrence of a short circuit are impossible.

I do not wish to be confined to the exact details shown, but I aim in my claims to cover all modifications which do not depart from the spirit and scope of my invention.

What I claim as new and desire to secure by Letters Patent is:—

1. In an alternating current dynamo electric machine, a stator having a winding consisting of coils having end turns arranged at two different angles to the axis of the machine, means for clamping and holding in fixed position the end turns arranged at one angle, and separate means for clamping and holding the end turns arranged at the other angle.

2. In an alternating current dynamo electric machine, a stationary armature having coils arranged in overlapping sets and having end turns arranged at different angles to the axis of the machine, means for clamping the end turns of the sets arranged at one angle directly to the frame of the machine, and brackets for supporting and clamping the end turns of the sets arranged at a different angle.

3. In an alternating current dynamo electric machine, a stationary armature having coils arranged in sets or groups, the sets having end turns bent outward at different angles to the axis of the machine, means for supporting and clamping the end turns arranged at one angle, and separate means for supporting and clamping the end turns arranged at another angle.

4. In a dynamo electric machine, a stationary armature having a multiphase winding consisting of coils arranged in sets or groups and having end turns bent at different angles to the axis of the machine, the end turns of the coils of each group being held a predetermined distance apart, and separate and independent means for each group for clamping the end turns to the frame of the machine.

5. In a dynamo electric machine, a stationary armature having a multiphase winding consisting of coils arranged in groups, each group consisting of a plurality of concentric coils, the end turns of which are held a predetermined distance apart, the groups of coils having overlapping end turns which are arranged at different angles to the axis of the machine, means for clamping the end turns of the groups arranged at one angle directly to the frame of the machine, and brackets secured to the frame of the machine for supporting and clamping the end turns of the group of coils arranged at another angle to the axis of the machine.

6. In a dynamo electric machine, an armature having coils the end turns of which extend beyond the ends of the armature core and at different angles to the axis of the machine, a plurality of supports for the end turns of the coils, and means comprising bolts for clamping the end turns to said supports.

7. In a dynamo electric machine, an armature having coils arranged in groups, independent brackets, each bracket supporting the end turns of a single group, and adjustable means carried by each bracket for clamping a group to the bracket.

8. In an alternating current dynamo electric machine, an armature having end turns extending beyond the ends of the armature core, brackets for supporting the end turns, each of said brackets having a slot in its outer end, and bolts passing through the slots in the brackets for holding and clamping the end turns of the coils in place.

9. In a dynamo-electric machine, a coil support in the form of a bracket adapted to be attached to the machine frame, said bracket having an engaging surface and an opening proximate thereto.

10. In a dynamo-electric machine, a coil support adapted to be secured to the machine frame, means for clamping said coil support to said frame, said coil support extending axially from said machine frame, said support having a slanted engaging surface and an opening approximate thereto, and means whereby coils may be secured to said engaging surface.

In testimony whereof I affix my signature, in the presence of two witnesses.

BERNARD ARTHUR BEHREND

Witnesses:
 LAURA E. WELCH,
 ARTHUR F. KWIS.